United States Patent
Takahashi et al.

(10) Patent No.: US 10,641,170 B2
(45) Date of Patent: May 5, 2020

(54) ADVANCED HUMID AIR GAS TURBINE SYSTEM

(71) Applicant: Mitsubishi Hitachi Power Systems, Ltd., Yokohama, Kanagawa (JP)

(72) Inventors: Yoshitaka Takahashi, Yokohama (JP); Kazuhiko Sato, Yokohama (JP); Yasushi Takeda, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 489 days.

(21) Appl. No.: 15/448,795

(22) Filed: Mar. 3, 2017

(65) Prior Publication Data
US 2017/0175623 A1    Jun. 22, 2017

Related U.S. Application Data

(63) Continuation of application No. 14/537,155, filed on Nov. 10, 2014, now Pat. No. 9,677,471.

(30) Foreign Application Priority Data

Nov. 11, 2013    (JP) .................................. 2013-232688

(51) Int. Cl.
*F01K 3/22* (2006.01)
*F01K 13/02* (2006.01)
(Continued)

(52) U.S. Cl.
CPC .............. *F02C 3/305* (2013.01); *F01D 19/00* (2013.01); *F01D 19/02* (2013.01); *F01D 21/00* (2013.01);
(Continued)

(58) Field of Classification Search
CPC . F01K 3/22; F01K 13/02; F01K 17/04; F01K 17/06; F01K 19/00; F01K 19/10;
(Continued)

(56) References Cited

U.S. PATENT DOCUMENTS

| RE36,524 E | 1/2000 | Tomlinson |
| 8,166,747 B2 * | 5/2012 | Obana ....................... F01K 9/04 |
| | | 60/39.511 |

(Continued)

FOREIGN PATENT DOCUMENTS

| CN | 1086581 A | 5/1994 |
| CN | 1162063 A | 10/1997 |

(Continued)

OTHER PUBLICATIONS

European Search Report dated May 6, 2015 (six (6) pages).

(Continued)

*Primary Examiner* — Todd E Manahan
*Assistant Examiner* — Kyle Robert Thomas
(74) *Attorney, Agent, or Firm* — Crowell & Moring LLP

(57) ABSTRACT

One of the objects of the invention is to provide a water-saving type advanced humid air gas turbine system (AHAT) that can decrease the amount of makeup water to be supplied from the outside, by reducing the amount of water consumed when the gas turbine system is starting up, shut down, or subjected to load rejection. The gas turbine system includes a compressor, the compressed air header for generating humidified combustion air, a combustor for generating combustion gas, and the turbine. When the gas turbine system is starting up, shut down or subjected to load rejection, steam coming from the heat recovery steam generator is recovered by blocking the first steam system and making the second steam system communicate with the heat recovery steam generator.

1 Claim, 3 Drawing Sheets

(51) Int. Cl.

| | |
|---|---|
| *F02C 3/30* | (2006.01) |
| *F01K 19/00* | (2006.01) |
| *F01K 17/06* | (2006.01) |
| *F02C 6/18* | (2006.01) |
| *F01K 11/00* | (2006.01) |
| *F01K 23/10* | (2006.01) |
| *F01K 17/04* | (2006.01) |
| *F01D 21/12* | (2006.01) |
| *F01D 21/00* | (2006.01) |
| *F01D 21/14* | (2006.01) |
| *F01D 19/00* | (2006.01) |
| *F01D 19/02* | (2006.01) |
| *F02C 3/04* | (2006.01) |

(52) U.S. Cl.
CPC ............ *F01D 21/12* (2013.01); *F01D 21/14* (2013.01); *F01K 3/22* (2013.01); *F01K 11/00* (2013.01); *F01K 13/02* (2013.01); *F01K 17/04* (2013.01); *F01K 17/06* (2013.01); *F01K 19/00* (2013.01); *F01K 23/10* (2013.01); *F02C 3/04* (2013.01); *F02C 3/30* (2013.01); *F02C 6/18* (2013.01); *F05D 2210/12* (2013.01); *F05D 2210/20* (2013.01); *F05D 2220/32* (2013.01)

(58) Field of Classification Search
CPC .. F01K 23/10; F02C 3/30; F02C 3/305; F02C 6/18; F01D 19/00; F01D 19/02; F01D 21/00; F01D 21/12; F01D 21/14
See application file for complete search history.

(56) References Cited

U.S. PATENT DOCUMENTS

| | | | |
|---|---|---|---|
| 2002/0026783 | A1 | 3/2002 | Utamura |
| 2002/0043063 | A1 | 4/2002 | Kataoka et al. |
| 2006/0107646 | A1 | 5/2006 | Hatamiya et al. |
| 2007/0214766 | A1* | 9/2007 | Obana ...................... F01K 9/04 60/39.15 |

FOREIGN PATENT DOCUMENTS

| | | |
|---|---|---|
| CN | 1207453 A | 2/1999 |
| EP | 0 959 235 A2 | 11/1999 |
| JP | 50-22951 | 3/1975 |
| JP | 11-324710 A | 11/1999 |
| JP | 2001-317705 A | 11/2001 |
| JP | 2003-239759 A | 8/2003 |
| JP | 2010-255456 A | 11/2010 |
| WO | WO 98/01658 | 1/1998 |

OTHER PUBLICATIONS

Chinese Office Action issued in counterpart Chinese Application No. 201410638548.9 dated Dec. 14, 2015 (thirteen (13) pages).
Japanese Office Action issued in counterpart Japanese Application No. 2013-232688 dated Jun. 27, 2017 (four pages).

* cited by examiner

ADVANCED HUMID AIR GAS TURBINE SYSTEM

CROSS REFERENCE TO RELATED APPLICATIONS

This application is a continuation of and claims priority to U.S. patent application Ser. No. 14/537,155, filed Nov. 10, 2014, the entire disclosure of which is incorporated herein by reference, which claims priority to Japanese Patent Application No. 2013-232688, filed Nov. 11, 2013, the priority of which is also claimed here.

BACKGROUND OF THE INVENTION

1. Field of the Invention

The present invention relates generally to advanced humid air gas turbine systems. Specifically, the invention relates to an advanced humid air gas turbine system that recovers moisture from exhaust gas after combustion and recycles it as humid air.

2. Description of the Related Art

In the operation of a gas turbine system, it is widely known in the art that steam is introduced into compressed air for combustion in order to improve power generation efficiency. This is because the introduction of steam increases the amount of working fluid, i.e., the compressed air for combustion to reduce the power necessary for a compressor to work.

The advanced humid air gas turbine system (hereinafter, referred to as AHAT) exemplified in JP-2010-255456-A is configured as follows. Steam introduced into a gas turbine from exhaust gas after combustion is condensed and recovered as recovered water. Impurities are removed from the recovered water with the use of an impurity removing device. Such recovered water is used to humidify the compressed air for combustion to be turned into humid compressed air for combustion. This system allows the heat present in the exhaust gas after combustion to be recovered to the inlet side of the combustor, which in turn raises the temperature of the compressed air for combustion. The system further improves the power generation efficiency as a result of the reduction in the fuel consumption.

SUMMARY OF THE INVENTION

The AHAT includes a water recovery system for recovering moisture from the exhaust gas of the gas turbine and a superheated steam generation system for generating superheated steam in the heat recovery steam generator that uses the exhaust gas of the gas turbine as a heat source. The superheated steam generated in the superheated steam generation system is introduced into the compressed air for combustion in the gas turbine.

Incidentally, in the operation of the gas turbine, superheated steam is not introduced into compressed air for combustion in order to prevent moisture from being condensed in the gas turbine at the time of start-up and shut-down. Also in the case of operation after load rejection has been carried out due to a system failure or the like during the operation of the gas turbine system, superheated steam is not introduced into compressed air for combustion.

If such a gas turbine cannot introduce superheated steam, the conventional AHAT is operated such that the superheated steam generated at a relief valve installed at the outlet of the hear recovery steam generator is discharged to the outside of the system.

When the AHAT is operated with DSS (Daily Start and Stop) cycles or it takes a long period of time until resynchronization after the load rejection, the amount of consumed water will increase. The increased amount of makeup water results in a rising running cost.

The present invention has been made in view of above-mentioned situations and aims to provide a water-saving type advanced humid air gas turbine system that can reduce the amount of makeup water to be supplied from the outside by reducing the amount of consumed water when the gas turbine system is starting up, shut down or subjected to load rejection.

To solve the foregoing problems, an aspect of the present invention incorporates, for example, the arrangements of the appended claims. This application includes a plurality of means for solving the problems. An exemplary aspect of the present invention provides an advanced humid air gas turbine system (AHAT) including: a gas turbine system; a heat recovery steam generator for generating steam by use of exhaust gas from a turbine; a water recovery system disposed on the downstream side of the heat recovery steam generator, the water recovery system recovering moisture contained in the exhaust gas; a first steam system for supplying steam, coming from the heat recovery steam generator, to a compressed air header; and a second steam system for supplying steam, coming from the heat recovery steam generator, to the heat recovery steam generator or the water recovery system. The gas turbine system includes a compressor for compressing air, the compressed air header for mixing high-pressure air introduced from the compressor with steam so as to generate humidified combustion air, a combustor for mixing the combustion air from the compressed air header with fuel for sake of combustion so as to generate combustion gas, and the turbine driven by the combustion gas that is generated by the combustor. When the gas turbine system is starting up, shut down or subjected to load rejection, steam coming from the heat recovery steam generator is recovered by blocking the first steam system and making the second steam system communicate with the heat recovery steam generator.

According to the present invention, the bypass system which bypasses the gas turbine and leads the generated steam into the system of the advanced humid air gas turbine system is installed at the steam outlet of the heat recovery steam generator. The amount of water consumed when the gas turbine is starting up, shut down, or subjected to load rejection can be reduced. The amount of makeup water to be supplied from the outside when the gas turbine is starting up, shut down, or subjected to load rejection can be reduced. Thus, a reduction in starting up cost can be achieved.

DESCRIPTION OF THE PREFERRED EMBODIMENTS

Preferred embodiments of an AHAT of the present invention will hereinafter be described with reference to the drawings.

First Embodiment

Figure 1:
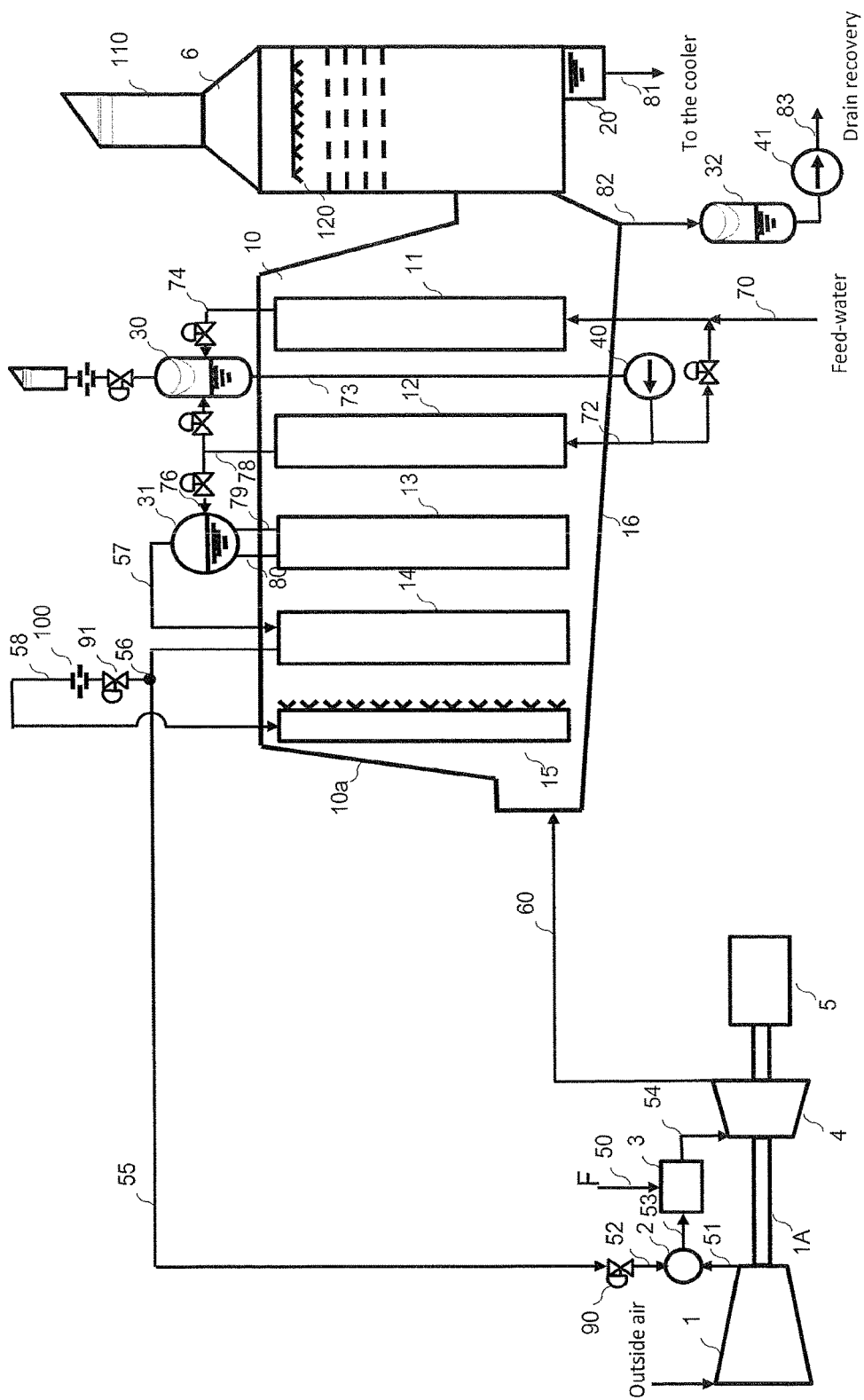
FIG. 1 is a schematic configuration diagram illustrating a first embodiment of an AHAT of the present invention.

FIG. 1 is a schematic configuration diagram illustrating a first embodiment of the AHAT of the present invention.

The AHAT includes a gas turbine system, a heat recovery steam generator 10 and a water recovery system 6 as a basic configuration. The gas turbine system includes a compressor 1, a compressed air header 2, a combustor 3, a turbine 4, a drive shaft 1A, and a generator 5. The compressor 1, the turbine 4, and the generator 5 are mechanically connected to one another by means of the drive shaft 1A.

The compressor 1 sucks and compresses outside air and supplies the compressed air as combustion air to the compressed air header 2 via a flow passage 51. The compressed air header 2 mixes superheated steam with the combustion air to generate humidified combustion air. The superheated steam is supplied from a superheater 14 of the heat recovery steam generator 10 via a pipe 52 and a pipe 55 to the compressed air header 2. The combustor 3 mixes the humidified combustion air supplied thereto via a flow passage 53 with fuel F supplied thereto via a pipe 50 for combustion to generate high-temperature and high-pressure combustion gas. This combustion gas is introduced via a flow passage 54 to the turbine 4 to drive the turbine 4, thereby driving the compressor 1 and the generator 5 via the drive shaft 1A. The rotary power of the turbine 4 is converted into electricity by the generator 5.

The heat recovery steam generator 10 is equipment that uses, as a heat source, exhaust gas that has driven the turbine 4 in the gas turbine system to generate steam. The heat recovery steam generator 10 includes a box-shaped casing 10a which covers its outer circumferential portion with a lagging material; an upstream opening portion provided on the upstream side of the casing 10a and connected to a duct 60 adapted to introduce exhaust gas that has driven the turbine 4; an exhaust gas passage through which the exhaust gas introduced from the upstream opening portion flows; a heat exchanger group; and a downstream opening portion provided on the downstream side of the casing 10a and adapted to supply the exhaust gas having passed through the heat exchanger group to a water recover system 6. The heat exchanger group is composed of the superheater 14, an evaporator 13 equipped with a steam drum 31, a high-temperature economizer 12 and a low-temperature economizer 11, which are arranged in this order from the upstream in the exhaust gas passage.

In the present embodiment, a steam nozzle 15 for jetting superheated steam in the direction of the exhaust gas passage is provided on the upstream side of the superheater 14 in the exhaust gas passage of the heat recovery steam generator 10. A pipe 58 is connected at one end thereof to the header of the steam nozzle 15. The pipe 58 has the other end coupled to a branch portion 56 provided on the pipe 55 connecting the heater 14 of the heat recovery steam generator 10 to the compressed air header 2. A steam nozzle adjusting valve 91 and an orifice 100 are provided on the pipe 58, the steam nozzle adjusting valve 91 being adapted to adjust the flow rate of superheated steam supplied to the steam nozzle 15. The steam nozzle adjusting valve 91 is closed during normal operation.

In the present embodiment, the lower structure of the casing 10a corresponding to the bottom of the heat recovery steam generator 10 is designed as an inclined structure 16 where the inclination descends from the upstream side toward the downstream side. A pipe 82 is provided at a minimum height portion on the most-downstream side of the inclined structure 16. This pipe 82 is made to communicate with a drain tank 32 for storing drain. The drain stored in the drain tank 32 is discharged to the outside of the AHAT by means of a pipe 83 arranged to extend toward the outside thereof, and a drain pump 41 installed on the pipe 83.

The water recovery system 6 sprays cooling water from a spray nozzle 120 to the exhaust gas from the heat recovery steam generator 10 to condense the moisture in the exhaust gas into water. The water recovery system 6 mixes such water with cooling water and recovers the mixture as recovery water 20. The remaining gas component resulting from removing the moisture from the exhaust gas is discharged to the atmosphere from a funnel 110 provided on the upper portion of the water recovery system 6. As the cooling water to be sprayed from the spray nozzle 120, the recovery water 20 is used that is supplied from the lower portion of the water recovery system 6 via a pipe 81 to an outside cooler (not shown) in which the water is cooled. The recovery water 20 supplied to the outside cooler for cooling may be purified with a water processing device (not shown) and the purified water may be reused as the feed water of the exhaust recovery boiler 10.

During the normal operation of the gas turbine system, the exhaust gas having driven the turbine 4 is supplied via the duct 60 to the heat recovery steam generator 10 before being subjected to heat exchange with the feed water or steam flowing inside the above-mentioned heat exchanger group. The superheated steam, generated from the superheater 14 due to such heat exchange, after passing through the pipe 55 connecting the superheater 14 to a superheated steam adjusting valve 90, is supplied to the compressed air header 2 via the superheated steam adjusting valve 90 and the pipe 52. The superheated steam adjusting valve 90 reduces the pressure inside the superheated steam to a pressure necessary for the gas turbine system to work. As a result, humidified air to be supplied to the combustor 3 is generated.

Moreover, during the normal operation of the gas turbine system, water is supplied from the outside via a pipe 70 to the low-temperature economizer 11. This water is subjected to heat exchange in the low-temperature economizer 11 and is then supplied via a pipe 74 to a deaerator 30 for deaeration of the water. Thereafter, such water passes through a pipe 73 and is increased in pressure at a feed-water pump 40. Then, the water is supplied via a pipe 72 to the high-temperature economizer 12, in which the water is subjected to heat exchange. The water leaving the high-temperature economizer 12 is supplied to the steam drum 31 via a pipe 78 and a pipe 76.

The water supplied to the steam drum 31 is circulated and heated through the evaporator 13, a pipe 79, and a pipe 80. Water and steam are separated from each other in the steam drum 31. The steam is supplied via a pipe 57 to the superheater 14. The steam supplied to the superheater 14 is further heated to be turned into superheated steam, which is supplied to the pipe 55.

A description will now be given of how the gas turbine system in the present embodiment is operated at the time of starting up and shut-down.

When moisture is prevented from being condensed in the gas turbine, such as when the gas turbine system is starting up or shut down, and when steam is not needed as after load rejection, a steam nozzle adjusting valve 91 is operatively opened and, at the same time, a superheated steam adjusting valve 90 is operatively closed first. In this way, superheated steam, led to the pipe 58, is jetted from the steam nozzle 15 toward the direction of the exhaust gas passage of the heat recovery steam generator 10. In addition, the inflow of the superheated steam toward the gas turbine is blocked.

The superheated steam jetted from the steam nozzle 15 toward the direction of the exhaust gas passage of the heat recovery steam generator 10 could be drained after being condensed with the high-temperature economizer 12 or the low-temperature economizer 13 in the heat recovery steam generator 10 in some cases. Such drain passes through the inclined structure 16 of the lower portion of the casing 10*a* of the heat recovery steam generator 10, goes through the minimum height portion on the most-downstream side and is stored in the drain tank 32. Then, the drain is discharged by the drain pump 41 to the outside of the system of the AHAT.

According to the first embodiment of the AHAT of the present invention described above, the bypass system is installed at the steam outlet of the heat recovery steam generator 10. The bypass system bypasses the gas turbine and leads the generated steam into the inside of the system of the AHAT. Therefore, the amount of water consumed when the gas turbine is starting up, shut down, or subjected to load rejection can be reduced. As a result, the amount of makeup water to be supplied from the outside when the gas turbine is starting up, shut down, or subjected to load rejection can be reduced. Therefore, a reduction in starting up cost can be achieved.

The present embodiment describes as an example the case where the steam nozzle 15 is installed on the most-upstream side of the exhaust gas passage of heat recovery steam generator 10. However, the present invention is not limited to this. The steam nozzle 15 can also be disposed on areas where the following conditions are met: the exhaust gas temperature in the exhaust gas passage of the heat recovery steam generator 10 is higher than saturated temperature corresponding to the inner pressure of the steam drum 31; and water condensation does not occur at the installation portion of the exhaust nozzle 15. These conditions are in order to avoid the problem such as a thermal shock. For example, a configuration is available in which the steam nozzle 15 is installed between the evaporator 13 and the superheater 14. Another possible configuration is that in which the evaporator 13 is divided into two evaporators and the steam nozzle 15 is installed between such two evaporators 13.

The present embodiment describes as an example the case where the drain discharge system including the drain pipe 82, the drain tank 32, and the drain pump 41 is provided to discharge the drain in the heat recovery steam generator 10. However, the present invention is not limited to this. The present embodiment may be configured such that drain can directly be discharged from the inclined structure 16 to the water recovery system 6. In this way, the drain discharge system can be omitted.

Second Embodiment

Figure 2:
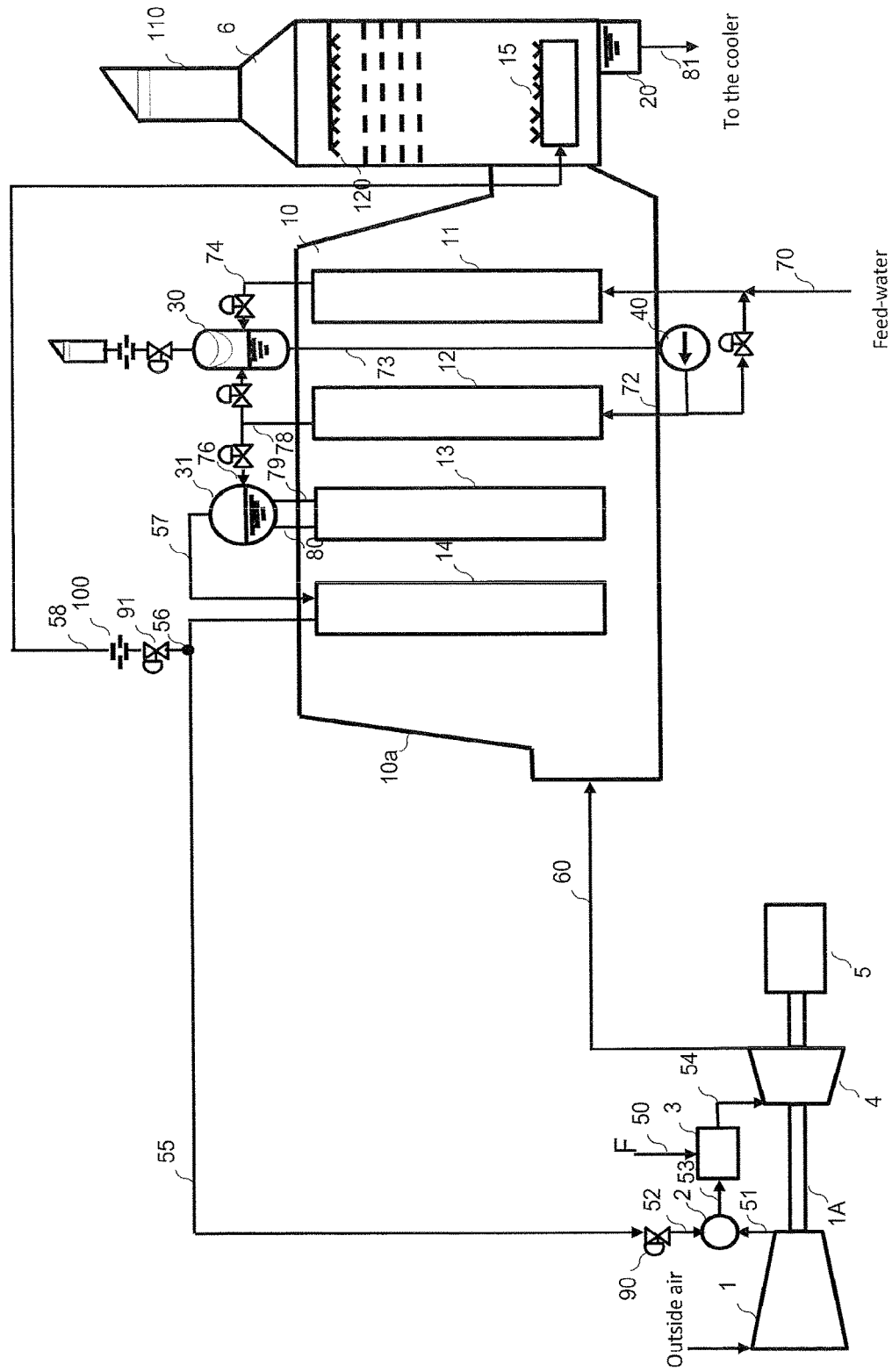
FIG. 2 is a schematic configuration diagram illustrating a second embodiment of an AHAT of the present invention.

A second embodiment of an AHAT according to the present invention is hereinafter described with reference to the drawings. FIG. 2 is a schematic configuration diagram illustrating a second embodiment of the AHAT of the present invention. In FIG. 2, the same reference numerals as those in FIG. 1 denote like portions and their detailed explanations are thus omitted.

The AHAT according to the second embodiment of the present invention shown in FIG. 2 is composed of almost the same devices as those in the first embodiment but is different from that of the first embodiment in the following configuration. In the present embodiment, the steam nozzle 15 is installed inside the water recovery system 6. The drain exhaust system including the drain pipe 82, the drain tank 32, and the drain pump 41 is omitted. The lower portion of the casing 10*a* of the heat recovery steam generator 10 is configured not to have the inclined structure but to have a flat structure.

In the second embodiment of the AHAT, when moisture is prevented from being condensed in the gas turbine, such as when the gas turbine system is starting up or shut down, and when steam is not needed as after load rejection, a steam nozzle adjusting valve 91 is operatively opened and, at the same time, a superheated steam adjusting valve 90 is operatively closed first. As a result, superheated steam, led to the pipe 58, is jetted from the steam nozzle 15 toward the inside of the water recovery system 6. In addition, the inflow of the superheated steam toward the gas turbine is blocked. The superheated steam jetted into the water recovery system 6 is condensed into recovery water 20 by use of the cooling water jetted from a spray nozzle 120. The recovery water 20 is recovered into the system of the AHAT.

Incidentally, the superheated steam jetted from the steam nozzle 15 is of a high temperature, which deviates from the temperature conditions inside the water recovery system 6. However, the steam nozzle 15 is arranged so as not to come into direct contact with members constituting the water recovery system 6. Thus, the water recovery system 6 can be designed on the basis of normal operational specifications.

The second embodiment of the AHAT of the present invention described above can produce the same advantages as those of the first embodiment.

According to the second embodiment of the AHAT of the present invention, drain is unlikely to occur in the heat recovery steam generator 10. It is not necessary to install the drain discharge system and to configure the lower portion of the casing 10*a* of the heat recovery steam generator 10 as the inclined structure. Accordingly, production costs can be reduced.

Third Embodiment

Figure 3:
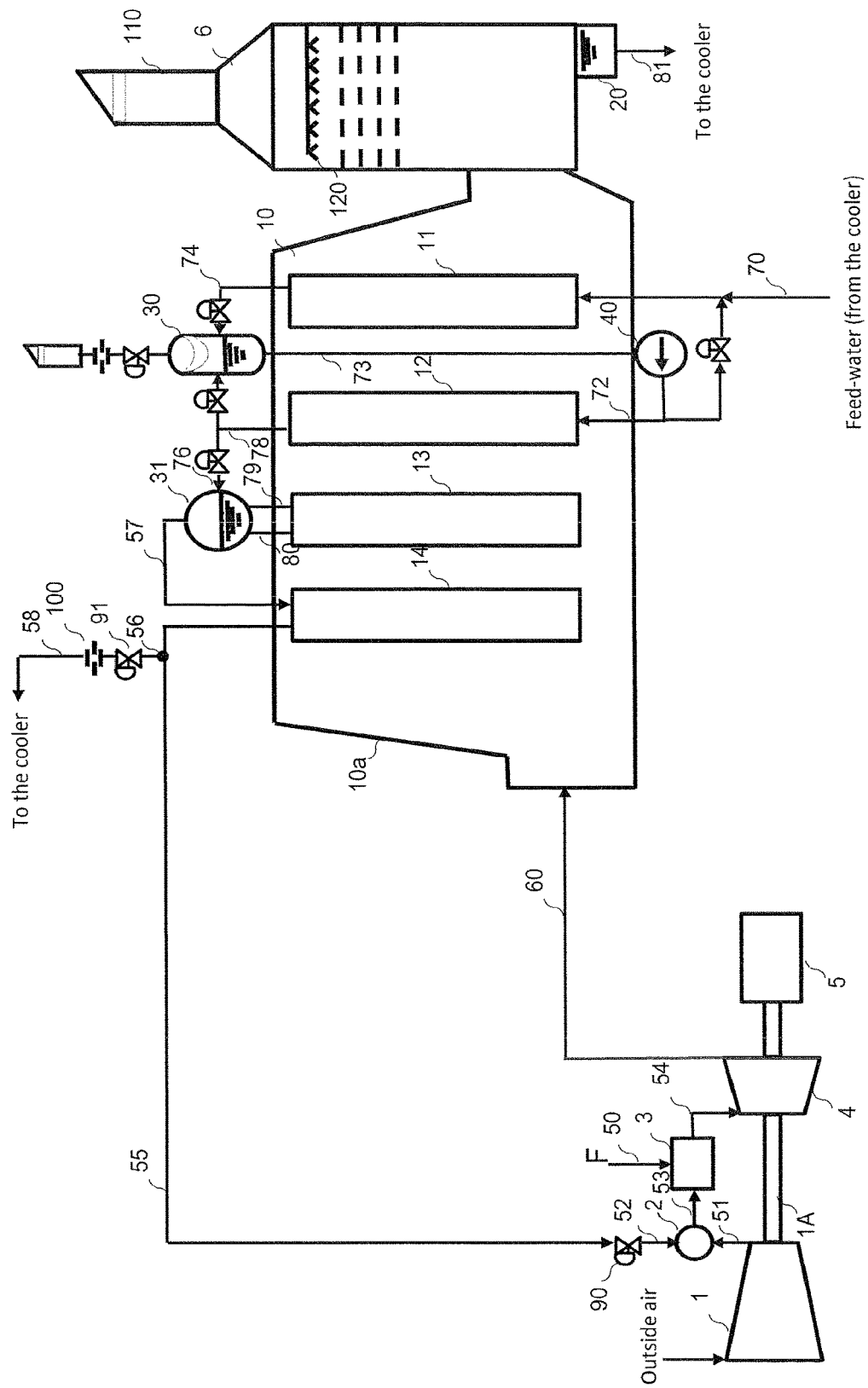
FIG. 3 is a schematic configuration diagram illustrating a third embodiment of an AHAT of the present invention.

A third embodiment of an AHAT according to the present invention will hereinafter be described with reference to the drawings. FIG. 3 is a schematic configuration diagram illustrating the third embodiment of the AHAT of the present invention. In FIG. 3, the same reference numerals as those in FIG. 1 denote like portions and their detailed explanations are thus omitted.

The AHAT according to the third embodiment of the present invention shown in FIG. 3 is composed of almost the same devices as those in the first embodiment but is different from that of the first embodiment in the following configuration. The pipe 58 is connected at one end thereof to the branch portion 56 of the pipe 55 and at the other end to the cooler of the gas turbine system. The drain exhaust system including the drain pipe 82, the drain tank 32, and the drain pump 41 is omitted. The lower portion of the casing 10*a* of the heat recovery steam generator 10 is configured so as not to have the inclined structure but to have a flat structure.

In the third embodiment of the AHAT, when moisture is prevented from being condensed in the gas turbine, such as when the gas turbine system is starting up or shut down, and when steam is not needed as after load rejection, a steam nozzle adjusting valve 91 is operatively opened and, at the same time, a superheated steam adjusting valve 90 is operatively closed first. As a result, superheated steam is led to the pipe 58 and the inflow of the superheated steam toward the gas turbine is blocked. The superheated steam led to the pipe 58 is condensed for reuse by use of the cooler located on the outside of the system of the AHAT.

The third embodiment of the AHAT of the present invention described above can produce the same advantages as those of the first embodiment.

What is claimed is:

1. An advanced humid air gas turbine system comprising:
   a gas turbine that includes a compressor for compressing air, a compressed air header for mixing high-pressure air introduced from the compressor with steam to generate humidified combustion air, a combustor for mixing combustion air from the compressed air header with fuel for sake of combustion so as to generate combustion gas, and a turbine driven by the combustion gas that is generated by the combustor;
   a heat recovery steam generator for generating steam by use of exhaust gas from the turbine;
   a water recovery system disposed on a downstream side of the heat recovery steam generator, the water recovery system condensing moisture in the exhaust gas into water by use of cooling water and recovering moisture contained in the exhaust gas;
   a first steam pipe connecting the heat recovery steam generator to the compressed air header and supplying steam, coming from the heat recovery steam generator, to the compressed air header;
   a second steam pipe for supplying steam, coming from the heat recovery steam generator, to the water recovery system; and
   a steam nozzle installed inside the water recovery system and jetting a superheated steam into the water recovery system;
   wherein the second steam pipe is directly connected to said steam nozzle;
   wherein the steam nozzle is arranged so as not to come into direct contact with a casing of the water recovery system; and
   wherein when the gas turbine is starting up, shut down, or subjected to load rejection, steam coming from the heat recovery steam generator is recovered by blocking the first steam pipe and making the second steam pipe communicate with the heat recovery steam generator.

* * * * *